United States Patent
Liu et al.

(10) Patent No.: US 6,950,890 B2
(45) Date of Patent: Sep. 27, 2005

(54) WIRELESS RECEIVING APPARATUS AND METHOD

(75) Inventors: Ching-Chiang Liu, Taipei (TW); Chun-Feng Weng, Taipei (TW)

(73) Assignee: Globlink Technology Inc., Taipei (TW)

( * ) Notice: Subject to any disclaimer, the term of this patent is extended or adjusted under 35 U.S.C. 154(b) by 502 days.

(21) Appl. No.: 10/026,972

(22) Filed: Dec. 27, 2001

(65) Prior Publication Data

US 2003/0126325 A1 Jul. 3, 2003

(51) Int. Cl.[7] .............................................. G06F 13/12
(52) U.S. Cl. .............................. 710/72; 710/8; 710/9; 710/12; 710/14; 710/62; 455/41.2; 455/65
(58) Field of Search ................................ 710/8–14, 62, 710/72–74; 455/41.2, 65

(56) References Cited

U.S. PATENT DOCUMENTS 5,881,366 A * 3/1999 Bodenmann et al. ...... 455/41.2
6,195,712 B1 * 2/2001 Pawlowski et al. ........... 710/19
6,597,292 B1 * 7/2003 Shigyo ................... 340/825.69
6,725,016 B1 * 4/2004 Jeong et al. ................... 455/65
6,810,436 B2 * 10/2004 Wu et al. ....................... 710/8

* cited by examiner

Primary Examiner—Jeffrey Gaffin
Assistant Examiner—Mike Nguyen
(74) Attorney, Agent, or Firm—Bacon & Thomas, PLLC

(57) ABSTRACT

A wireless receiving apparatus and method utilizes a single MCU (microprocessor control unit) in the wireless receiver to receive and process signals having different frequencies transmitted from a plurality of peripheral devices simultaneously, and then performs the steps of reading a predetermined processing procedure from a memory with respect to each of the signals respectively, performing a predetermined process with respect to each of the signals, storing an index of the last finished step for each signal in the memory respectively after at least a set of steps of the predetermined process has been performed, and continuing to perform the steps following the indices of the previous set of steps stored in the memory for carrying out a next set of steps for each signal, and repeating a plurality of sets of steps until all received signals have been processed.

7 Claims, 5 Drawing Sheets

WIRELESS RECEIVING APPARATUS AND METHOD

FIELD OF THE INVENTION

The present invention relates to wireless receiving and more particularly to a wireless receiving apparatus and method with improved characteristics.

BACKGROUND OF THE INVENTION

A conventional wireless receiver 1 is shown in FIG. 1 and comprises a signal receiving circuit 11, a first MCU (microprocessor control unit) 13, and a second MCU 15. Each of MCUs 13 and 15 has one end coupled to signal receiving circuit 11 and the other end coupled to a computer 16. In operation, signal receiving circuit 11 receives signals transmitted from signal transmission circuit 171 of wireless keyboard 17 and signal transmission circuit 181 of wireless mouse 18 respectively. Such signals are in turn sent to MCUs 13 and 15 for processing. Eventually, the processed signals are sent to computer 16 for further processing.

However, the prior art suffered from a disadvantage. For example, in the wireless receiver 1 only the first MCU 13 can receive and process signals transmitted from wireless keyboard 17 and only the second MCU 15 can receive and process signals transmitted from wireless mouse 18 respectively. Hence, two MCUs are required in the wireless receiver 1 so as to receive both signals from wireless keyboard 17 and wireless mouse 18. This inevitably makes the wireless receiver 1 much too complicated, making a reduction in size impossible. Thus a need for improvement exists.

SUMMARY OF THE INVENTION

It is therefore an object of the present invention to provide a wireless receiving apparatus comprising a single MCU (microprocessor control unit) which is capable of both receiving and processing signals having different frequencies transmitted from a plurality of peripheral devices simultaneously. By utilizing this apparatus, it is possible to synchronously receive signals so as to decrease the number of MCUs, simplify the circuitry, and reduce the size of the wireless receiving apparatus.

In one aspect of the present invention, when MCU processes signals having different frequencies transmitted from a plurality of peripheral devices, a wireless receiving method comprises reading a predetermined processing procedure with respect to the signal from a memory, performing a predetermined process with respect to the signal based on the predetermined processing procedure, after at least one step of the predetermined processing procedure has been performed with respect to the signal storing index of the last finished step in the memory, repeating until a set of steps have been performed with respect to the signal, the MCU continuing to perform steps immediately by following the indices of the previous set of steps which are stored in the memory for carrying out a next set of steps, and repeating a plurality of sets of steps above until all received signals have been processed.

The above and other objects, features and advantages of the present invention will become apparent from the following detailed description taken with the accompanying drawings.

DETAILED DESCRIPTION OF THE PREFERRED EMBODIMENTS

Figure 1:
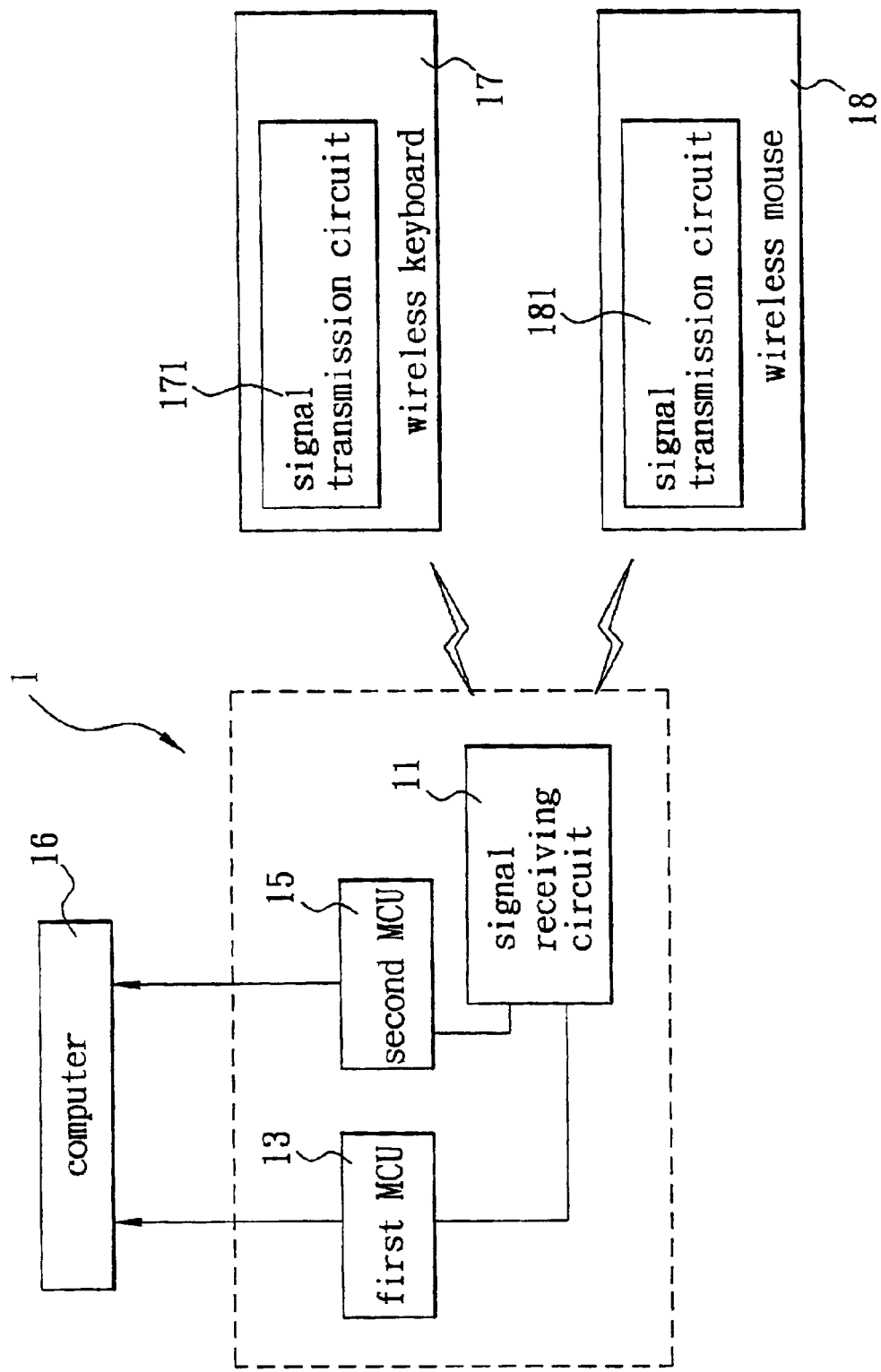
FIG. 1 is a block diagram of a conventional wireless receiver.
Figure 2:
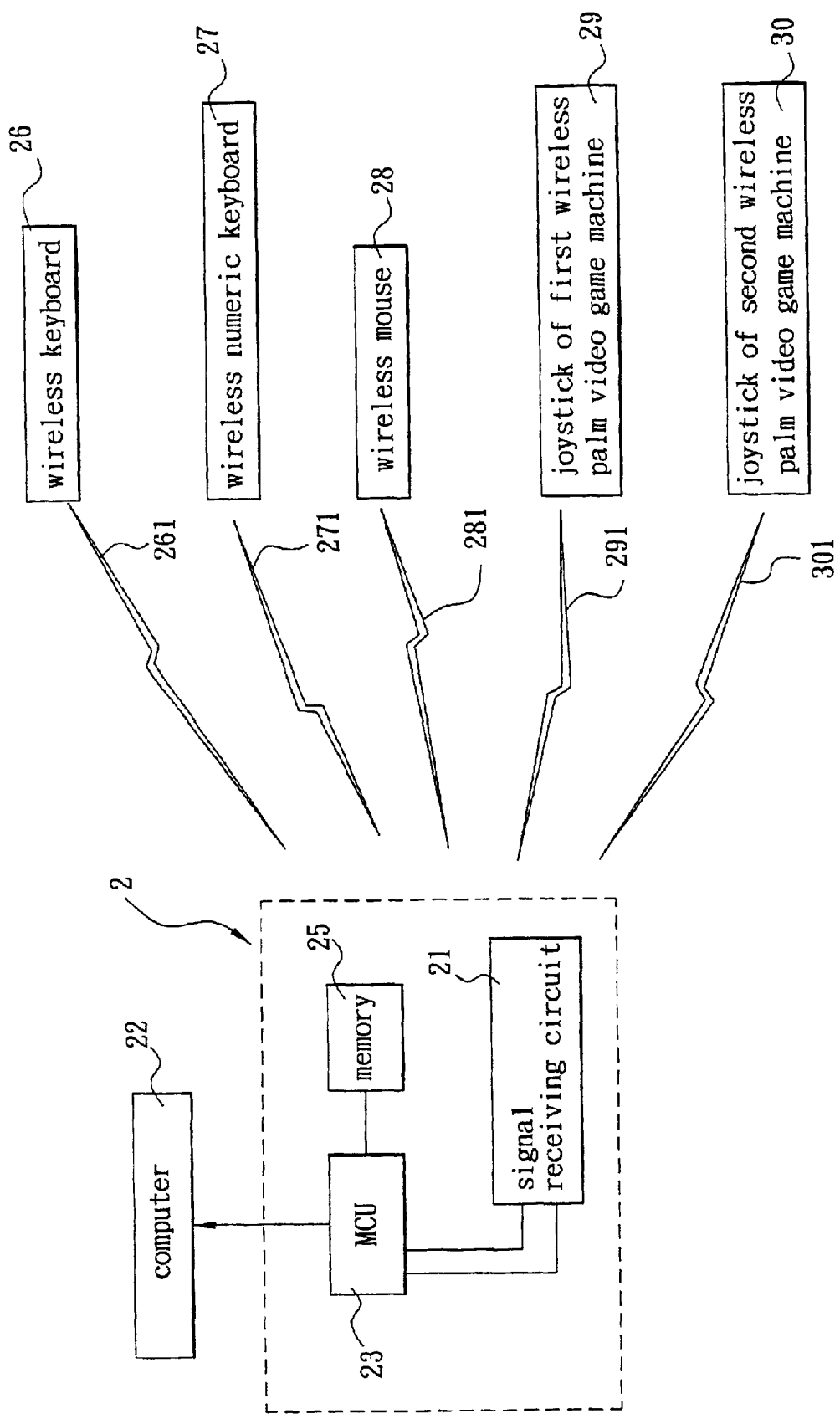
FIG. 2 is a block diagram of a preferred embodiment of wireless receiving apparatus according to the invention.

Referring to FIG. 2, there is shown a wireless receiving apparatus 2 constructed in accordance with the invention comprising a signal receiving circuit 21, a MCU (microprocessor control unit) 23, and a memory 25. MCU 23 is electrically coupled to signal receiving circuit 21, memory 25, and a computer 22 respectively. The signal receiving circuit 21 can receive various signals 261, 271, 281, 291, and 301 having different frequencies from a plurality of peripheral devices (e.g., wireless keyboard 26, wireless numeric keyboard 27, wireless numeric keyboard 28, joystick of first wireless palm video game machine 29, and joystick of second wireless palm video game machine 30). Then the received signals are sent to MCU 23 for processing. Next, the processed signals are sent to computer 22. In response, a CPU (central processing unit) of computer 22 can perform a processing based on data contained in the signals. The signal receiving circuit 21 classifies signals into different types having different bandwidths based on transmission frequencies of peripheral devices beforehand. Hence, signal receiving circuit 21 can receive signals from peripheral devices sequentially based on the signal type and the bandwidth. The received signals are in turn sent to MCU 23 which is capable of sequentially performing a mode of multi-segment multi-task data processing with respect to the signals in accordance with the invention. Further, after at least one step of the predetermined processing procedure has been performed MCU 23 stores index of the last finished step in memory 25. Furthermore, after a set of steps have been performed MCU 23 can read the indices of the immediately previous set of steps from memory 25. Then, at least one step of the predetermined processing procedure is performed following the indices of previous steps. By repeating above process, it is possible of storing a processing procedure beforehand for performing a processing of all signals.

The invention signal receiving circuit 21 first sequentially receives various signals 261, 271, 281, 291, and 301 from a plurality of peripheral devices 26, 27, 28, 29, and 30. Then the received signals are sent to MCU 23 for identification processing. Next, a corresponding procedure of the signals stored in memory 25 is read out beforehand by the MCU so as to perform a predetermined processing procedure with respect to the signals. After at least one step of the predetermined processing procedure has been performed, the index of the last finished step is stored in memory 25. Further, after a set of steps have been performed, MCU 23 can read the indices of the immediately previous set of steps from memory 25. Then, at least one step of the predetermined processing procedure is performed following the indices of previous steps by repeating the above process for sequentially processing the signals in a multi-segment multi-task data processing mode until all signals have been processed. Finally, all processed signals are sent to computer 22.

Figure 3:
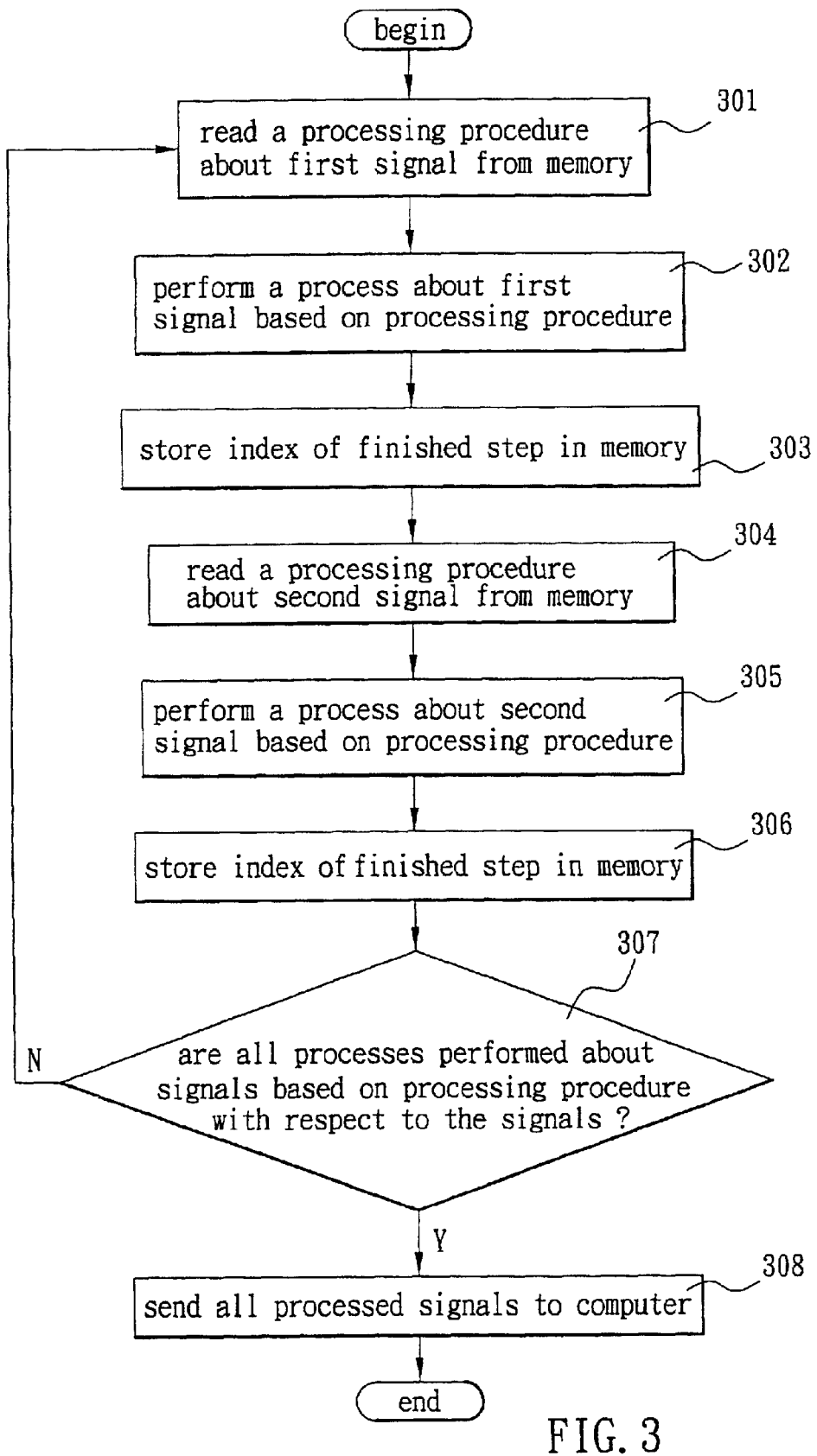
FIG. 3 is a flow chart illustrating a process according to the invention.

Referring to FIG. 3, there is shown a flow chart illustrating a process according to the invention. First of all, signal receiving circuit 21 sequentially receives various signals from peripheral devices 26, 27, 28, 29, and 30. Then the received signals are processed for identification. Next, the following steps are performed with respect to the signals:

In step 301, first read a predetermined processing procedure with respect to first signal from memory 25.

In step 302, perform a predetermined process with respect to first signal based on the predetermined processing procedure.

In step 303, after at least one step of the predetermined processing procedure has been performed with respect to the first signal, storing an index of the last finished step in memory 25.

In step 304, first read a predetermined processing procedure with respect to second signal from memory 25.

In step 305, perform a predetermined process with respect to second signal based on the predetermined processing procedure.

In step 306, after at least one step of the predetermined processing procedure has been performed with respect to the second signal, storing an index of the last finished step in memory 25.

In step 307, after a set of steps (i.e., steps 301 to 306) have been performed, the MCU continues to perform unfinished steps with respect to the signals based on stored indices in memory for performing a next set of steps immediately thereafter. The above process is repeatedly performed. Further, a determination is made whether all processes have been performed with respect to the signals based on the predetermined processing procedure with respect to the signals. If yes, the process goes to step 308. Otherwise, the process loops back to step 301.

In step 308, send all processed signals to computer 22. Thus, computer 22 can perform a processing based on data contained in the signals.

With this, it is possible to synchronously process signals transmitted from the plurality of peripheral devices so as to decrease the number of required MCUs.

Frequencies of signals transmitted from peripheral devices 26, 27, 28, 29, and 30 are set as either first frequency of 27 MHz or second frequency of 27.12 MHz in which wireless keyboard 26, wireless numeric keyboard 27, and joystick of first wireless palm video game machine 29 use first frequency of 27 MHz and wireless numeric keyboard 28 and joystick of second wireless palm video game machine 30 use second frequency of 27.12 MHz. Also, signal receiving circuit 21 is set to receive first and second frequencies.

Figure 4:
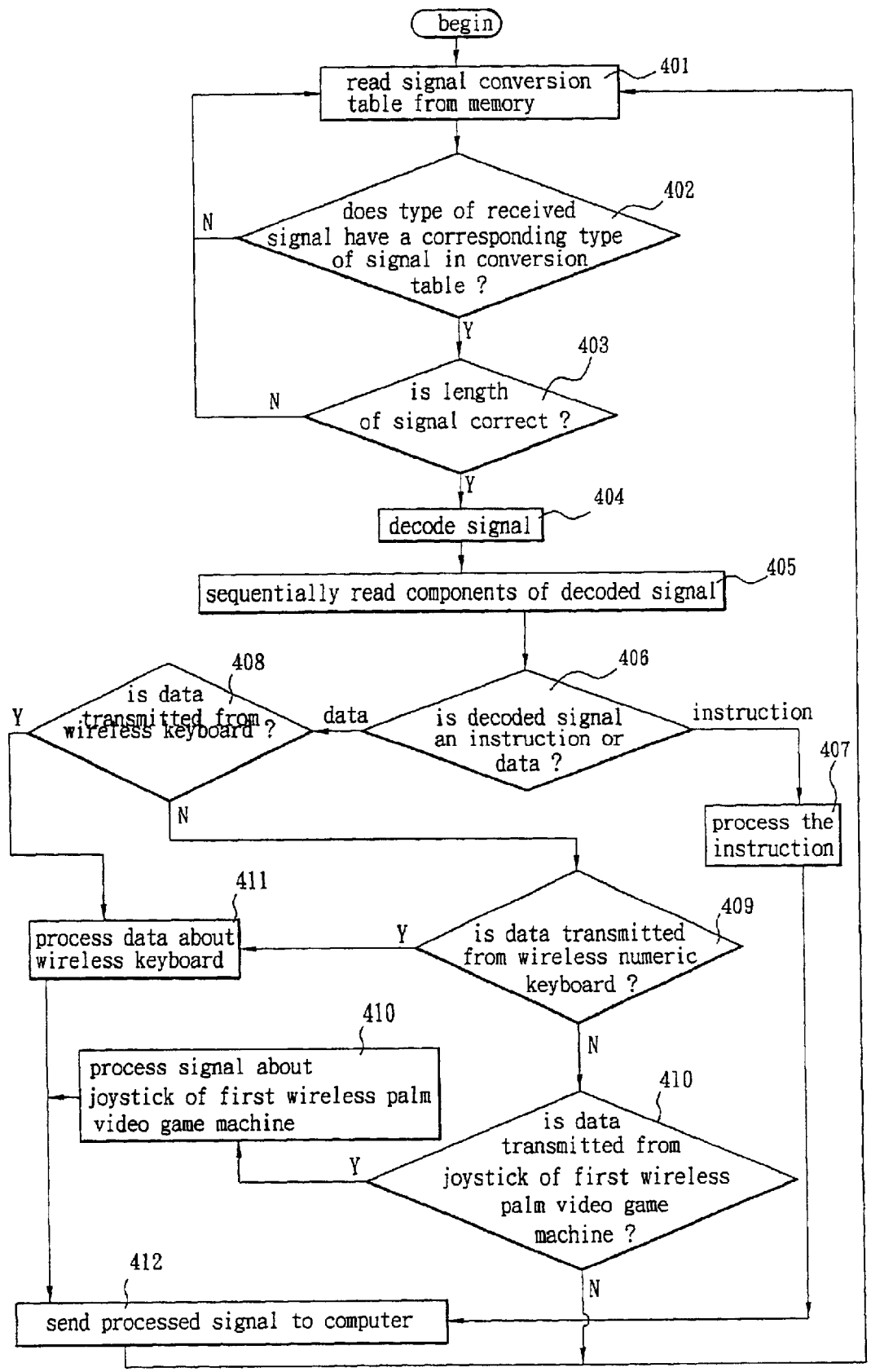
FIG. 4 is a flow chart illustrating a process applicable to peripheral devices having signals transmitted in first frequencies according to the invention.

Referring to FIG. 4, there is shown a flow chart illustrating a process according to a first embodiment of the invention. After MCU 23 has finished an identification, a process is performed with respect to the signal having the first frequency transmitted from signal receiving circuit 21 in a multi-segment multi-task data processing mode. The steps of the process are as follows:

In step 401, after signal having first frequency transmitted from signal receiving circuit 21 has been received, read a signal conversion table stored in memory 25.

In step 402, a determination is made whether a type of the received signal has a corresponding type of signal in conversion table. If yes, process goes to step 403. Otherwise, process loops back to step 401.

In step 403, a determination is made whether a length of the signal is correct based on data of the corresponding signal recorded in conversion table. If yes, process goes to step 404. Otherwise, process loops back to step 401.

In step 404, decode the signal based on a corresponding decoding procedure recorded in conversion table.

In step 405, sequentially read components of the decoded signal.

In step 406, a determination is made whether the decoded signal is either instruction or data. If it is instruction, process goes to step 407. Otherwise, process goes to step 408.

In step 407, perform a processing with respect to the instruction. The process goes to step 412.

In step 408, a determination is made whether data is transmitted from a wireless keyboard. If yes, process goes to step 411. Otherwise, process goes to step 409.

In step 409, a determination is made whether data is transmitted from a wireless numeric keyboard. If yes, process goes to step 411. Otherwise, process goes to step 410.

In step 410, a determination is made whether data is transmitted from a joystick of first wireless palm video game machine. If yes, perform a processing on the signal for converting it into a signal corresponding to joystick of first wireless palm video game machine prior to going to step 412. If not, process goes to step 412.

In step 411, perform a processing on data transmitted from wireless keyboard.

In step 412, send the processed signal to computer so that CPU of computer can perform a processing based on data contained in the signals. Process loops back to step 401 for repeating the steps.

Figure 5:
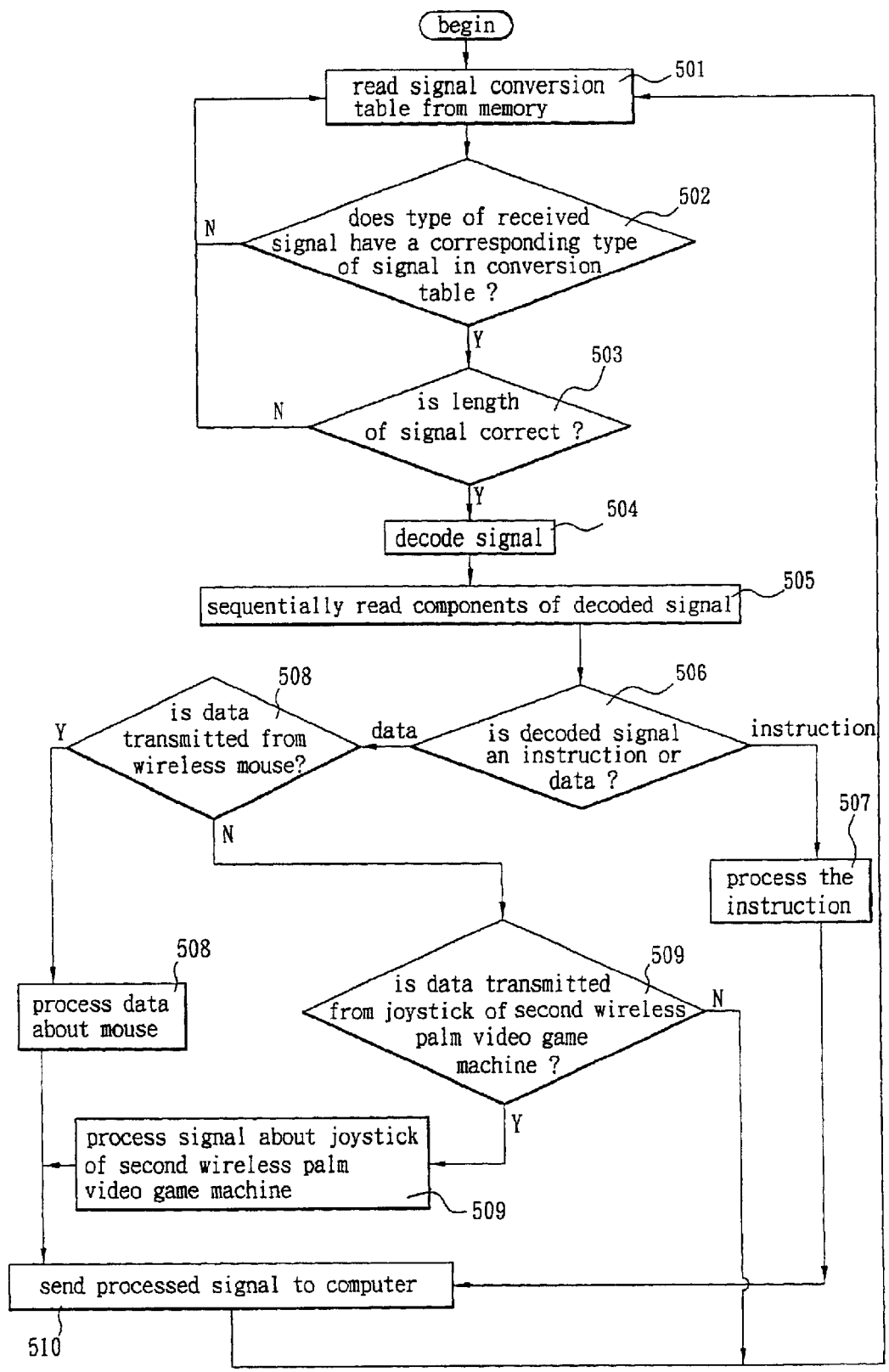
FIG. 5 is a flow chart illustrating a process applicable to peripheral devices having signals transmitted in second frequencies according to the invention.

Referring to FIG. 5, there is shown a flow chart illustrating a process according to a second embodiment of the invention. MCU 23 performs a process with respect to signal having second frequency transmitted from signal receiving circuit 21 in a mode of multi-segment multi-task data processing. Steps of the process are as follows:

In step 501, after signal having first frequency transmitted from signal receiving circuit 21 has been received, read a signal conversion table stored in memory 25.

In step 502, a determination is made whether a type of the received signal has a corresponding type of signal in conversion table. If yes, process goes to step 503. Otherwise, process loops back to step 501.

In step 503, a determination is made whether a length of the signal is correct based on data of the corresponding signal recorded in conversion table. If yes, process goes to step 504. Otherwise, process loops back to step 501.

In step 504, decode the signal based on a corresponding decoding procedure recorded in conversion table.

In step 505, sequentially read components of the decoded signal.

In step 506, a determination is made whether the decoded signal is either instruction or data. If it is instruction, process goes to step 507. Otherwise, process goes to step 508.

In step 507, perform a processing with respect to the instruction. The process goes to step 510.

In step 508, a determination is made whether data is transmitted from a wireless mouse. If yes, perform a processing on data transmitted from wireless mouse. Otherwise, process goes to step 509.

In step 509, a determination is made whether data is transmitted from a joystick of second wireless palm video game machine. If yes, perform a processing on the signal for converting it into a signal corresponding to joystick of second wireless palm video game machine prior to going to step 510. If not, process goes to step 501.

In step 510, send the processed signal to computer so that CPU of computer can perform a processing based on data contained in the signals. Process loops back to step 501 for repeating the steps.

In brief, the wireless receiving apparatus of the present invention comprises a single MCU which is capable of both receiving and processing signals having different frequencies transmitted from a plurality of peripheral devices simultaneously. By utilizing this apparatus, it is possible to decrease the number of MCUs, simplifying the circuitry and reducing the size of the wireless receiving apparatus.

Referring to FIG. 2 again, there is shown another embodiment of the invention. The signal receiving circuit 21 receives signals from a plurality of peripheral devices by polling. That is, a signal including an identification query is sequentially transmitted to each peripheral device. In response, each peripheral device sends back an identification to signal receiving circuit 21 for identification. This can effect a successful connection between signal receiving circuit 21 and each peripheral device. Hence, signal receiving circuit 21 can sequentially receive signals transmitted from each peripheral device prior to sending to MCU 23 for further processing.

Referring to FIG. 2 again, there is shown still another embodiment of the invention wherein memory 25 is provided in MCU 23.

While the invention has been described by means of specific embodiments, numerous modifications and variations could be made thereto by those skilled in the art without departing from the scope and spirit of the invention set forth in the claims.

What is claimed is:

1. A wireless receiving method implemented in a wireless receiving apparatus having a single MCU (microprocessor control unit), wherein after the single MCU has sequentially received signals having different frequencies transmitted from a plurality of peripheral devices in a multi-segment multi-task data processing mode and finished a process for identifying the received signals, the single MCU performs the steps of:

(a) reading a predetermined processing procedure with respect to a first signal having a first frequency from a memory;

(b) performing a first predetermined process with respect to the first signal based on the predetermined processing procedure;

(c) storing an index of a last finished step of said first predetermined process with respect to the first signal in the memory, after at least one step of the first predetermined process has been performed with respect to the first signal;

(d) reading the predetermined processing procedure with respect to a second signal having a second frequency different from the first frequency from the memory;

(e) performing a second predetermined process with respect to the second signal based on the predetermined processing procedure;

(f) storing an index of a last finished step of said second predetermined process with respect to the second signal in the memory, after at least one step of the second predetermined process has been performed with respect to the second signal;

(g) determining whether all predetermined processes have been performed on the signals based on the predetermined processing procedure with respect to the signals; and (h) sending all of the processed signals to a computer for processing based on data contained in the signals if a result of the determination in step (g) is positive, and otherwise looping back to step (a) and performing additional steps of any processing procedures that have not yet been completed.

2. The method of claim 1, further comprising the steps of:

(i) reading a signal conversion table stored in the memory, after the signal has been received;

(j) determining whether a type of the received signal has a corresponding type of a signal recorded in the conversion table;

(k) determining whether a length of the received signal is correct based on data of a corresponding signal recorded in the conversion table, if a result of the determination in step (j) is positive; and (l) decoding the signal based on a corresponding decoding procedure recorded in the conversion table if a result of the determination in step (k) is positive, and sequentially reading components of the decoded signal, and sending all of the processed signals to the computer so that a CPU (central processing unit) of the computer is capable of processing based on data contained in the signal.

3. The method of claim 2, further comprising the step of, if the result of the determination in step (j) is negative, discarding the signal so as to continue to receive signals.

4. The method of claim 2, further comprising the step of, if the result of the determination in step (k) is negative, discarding the signal so as to continue to receive signals.

5. The method of claim 2, wherein the processing based on data contained in the signal comprises a first processing with respect to a wireless peripheral device corresponding to the signal.

6. The method of claim 2, wherein the processing based on data contained in the signal comprises a second processing with respect to an instruction or data corresponding to the signal.

7. A wireless receiving apparatus comprising:

a signal receiving circuit for receiving signals having different frequencies from a plurality of peripheral devices and classifying the signals based on the frequencies;

a memory for storing data and a conversion table which is capable of recording types, processing procedures, and decoding procedures of the plurality of signals; and an MCU (microprocessor control unit) electrically coupled to the signal receiving circuit, the memory, and a computer respectively so that the MCU is capable of receiving the signals from the peripheral device, wherein the received signals are send to the MCU for identification, and by utilizing a multi-segment multi-task data processing the MCU is capable of reading the corresponding processing procedure and decoding procedure from the memory, performing a first predetermined process with respect to a first signal having a first frequency based on the processing procedure for the first signal after at least one step has been performed with respect to the first signal, storing in the memory an index of a last finished step performed with respect to the first signal, performing a second predetermined process with respect to a second signal having a second frequency different from the first frequency based on the processing procedure for the second signal after at least one step has been performed with respect to the second signal, storing in the memory an index of a last finished step performed with respect to the second signal, and repeating until a set of steps have been performed with respect to the first and the second signals, the MCU continuing to perform steps immediately by following the indices of the previous set of steps with are stored in the memory for carrying out a next set of steps, repeating until all of the signals have been processed, and finally sending all of the processed signals to the computer for processing based on data contained in the signals.

* * * * *